United States Patent
Benisty

(10) Patent No.: US 10,901,624 B1
(45) Date of Patent: Jan. 26, 2021

(54) DUMMY HOST COMMAND GENERATION FOR SUPPORTING HIGHER MAXIMUM DATA TRANSFER SIZES (MDTS)

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/739,095

(22) Filed: Jan. 9, 2020

Related U.S. Application Data

(63) Continuation-in-part of application No. 16/459,183, filed on Jul. 1, 2019.

(51) Int. Cl.
*G06F 13/38* (2006.01)
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 8,407,407 B1 | 3/2013 | Adler et al. | |
| 9,075,708 B1 | 7/2015 | Kang et al. | |
| 9,645,739 B2 | 5/2017 | Veal et al. | |
| 9,652,376 B2 | 5/2017 | Kuzmin et al. | |
| 9,720,860 B2 | 8/2017 | Rose et al. | |
| 9,904,609 B2 | 2/2018 | Miomo | |
| 10,282,132 B2 | 5/2019 | A et al. | |
| 10,445,013 B2 * | 10/2019 | Lei | G06F 12/00 |
| 10,761,775 B2 * | 9/2020 | Kachare | G06F 3/0679 |

(Continued)

OTHER PUBLICATIONS

Bjorling, Matias et al.; "LightNVM: The Linux Open-Channel SSD Subsystem"; Usenix, The Advanced Computing Systems Association; 15th USENIX Conference on File and Storage Technologies (FAST '17); https://www.usenix.org/conference/fast17/technical-sessions/presentation/bjorling; Santa Clara, CA, Feb. 27-Mar. 2, 2017 (17 pages).

(Continued)

*Primary Examiner* — Cheng Yuan Tseng
(74) *Attorney, Agent, or Firm* — Patterson & Sheridan, LLP; Steven H. Versteeg

(57) ABSTRACT

The present disclosure generally relates to systems and methods for executing commands that are larger than the maximum data transfer size (MDTS) on a data storage device. The data storage device advertises to the host device a MDTS that is higher than the actual MDTS that the data storage device can actually handle. If the data storage device receives a command that is equal to or less than the actual MDTS, then the data storage device processes the command normally. If the data storage device receives a command that is greater than the actual MDTS, but with less than or equal to the advertised MDTS, the data storage device splits the command into a plurality of dummy commands for processing. Once all of the dummy commands have processed, the data storage device delivers a completion message to the host device.

20 Claims, 5 Drawing Sheets

(56) References Cited

U.S. PATENT DOCUMENTS

| | | |
|---|---|---|
| 2007/0195367 A1* | 8/2007 | Kumagai .............. G06F 3/1285 |
| | | 358/1.16 |
| 2017/0308329 A1 | 10/2017 | A et al. |
| 2018/0088841 A1 | 3/2018 | Ma et al. |
| 2018/0225065 A1 | 8/2018 | Singh et al. |
| 2018/0260148 A1 | 9/2018 | Klein |
| 2019/0079702 A1 | 3/2019 | Yeon et al. |
| 2019/0095123 A1 | 3/2019 | Lin |
| 2019/0166201 A1 | 5/2019 | Choi et al. |
| 2019/0324692 A1 | 10/2019 | Kuwamura |

OTHER PUBLICATIONS

Sooyun Lee et al.; "Adaptive Priority Boosting Technique of the Host Level FTL in Open-Channel SSDs", Proceeding of the Korean Intstitute of Information Scientists and Engineers Conference. Dec. 2018; https://www.dbpia.co.kr/pdfView.do?nodeId=NODE07613929&mark=0&useDate=&bookmarkCnt=0&ipRange=N&language=ko_KR (p. 1311-1313).

International Search Report and Written Opinion issued in corresponding International Patent Application No. PCT/US2020/023177, dated Jul. 7, 2020 (7 pages).

\* cited by examiner

DUMMY HOST COMMAND GENERATION FOR SUPPORTING HIGHER MAXIMUM DATA TRANSFER SIZES (MDTS)

CROSS-REFERENCE TO RELATED APPLICATIONS

This application is a continuation-in-part of co-pending U.S. patent application Ser. No. 16/459,183, filed Jul. 1, 2019, which is herein incorporated by reference.

BACKGROUND OF THE DISCLOSURE

Field of the Disclosure

Embodiments of the present disclosure generally relate to systems and methods for executing commands that are larger than the maximum data transfer size (MDTS) on a data storage device.

Description of the Related Art

A solid state drive (SSD) storage device is a data storage device commonly composed of a controller and an SSD memory (e.g., a non-volatile NAND flash). In all SSD storage devices, the controller sits between one or more host computing systems and the SSD memory.

NVM Express is based on a paired Submission and Completion Queue mechanism. Commands are placed by host software into a Submission Queue. Completions are placed into the associated Completion Queue by the controller. In general, Submission and Completion Queues are allocated in Host memory.

One of the important parameters of the device advertised to the Host at the initialization phase is the MDTS. This field indicates the maximum data size that can be transferred between the host and the controller. The host should not submit a command that exceeds the MDTS. If a command is submitted that exceeds the MDTS, then the command is aborted with a status of Invalid Field in Command. A value of 0h indicates no restrictions on transfer size. The restriction includes metadata if it is interleaved with the logical block data. The restriction does not apply to commands that do not transfer data between the host and the controller (e.g., Write Uncorrectable command or Write Zeroes command). For client SSDs, the typical requirements for MDTS are 128K and up to 512K. For enterprise SSDs, the typical requirements for MDTS are 1M or no limit.

The higher value of the MDTS, the better capability and flexibility the storage device has. However, the better capability and flexibility is not for free. High values of MDTS complicates exception scenarios such as graceful reset and abort flows. For instance, having very large commands pending in the device will extend the reset duration and may violate the NVMe standard. In addition, supporting very large commands by the device may require larger buffers and internal databases that increase the area and cost of the storage device.

Thus, there is a need to support high values of MDTS without introducing any impact on the device controller or affecting other parameters.

SUMMARY OF THE DISCLOSURE

The present disclosure generally relates to systems and methods for executing commands that are larger than the maximum data transfer size (MDTS) on a data storage device. The data storage device advertises to the host device a MDTS that is higher than the actual MDTS that the data storage device can actually handle. If the data storage device receives a command that is equal to or less than the actual MDTS, then the data storage device processes the command normally. If the data storage device receives a command that is greater than the actual MDTS, but with less than or equal to the advertised MDTS, the data storage device splits the command into a plurality of dummy commands for processing. Once all of the dummy commands have processed, the data storage device delivers a completion message to the host device.

In one embodiment, a data storage device comprises: a memory device; and a controller communicatively coupled to the memory device, wherein the controller is configured to: retrieve a command from a host device, wherein the command exceeds the maximum data transfer size (MDTS) for the data storage device; split the command into a plurality of dummy commands; process the dummy commands; and deliver a completion notification to the host device.

In another embodiment, a data storage device comprises: a memory device; and a controller communicatively coupled to the memory device, wherein the controller is configured to: receive an indication that the memory has executed a dummy command, wherein the dummy command is one of a plurality of dummy commands corresponding to a command received from a host device; determine whether the memory device has executed all of the plurality of dummy commands corresponding to the command; generate a completion message indicating execution of the command if the memory device has executed each of the plurality of dummy commands; and transmit the completion message to the host device.

In another embodiment, an apparatus comprises: means for receiving a command from a host device, wherein the command exceeds the maximum data transfer size (MDTS) for the device; means for generating a set of dummy commands, wherein each dummy command in the set of dummy commands corresponds to a portion of the command, and wherein each dummy command in the set of dummy commands is configured to be executed by a means for storing digital data; and means for generating a message to the host device indicating completion of the command in response to the execution of the set of dummy commands by the means for storing digital data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
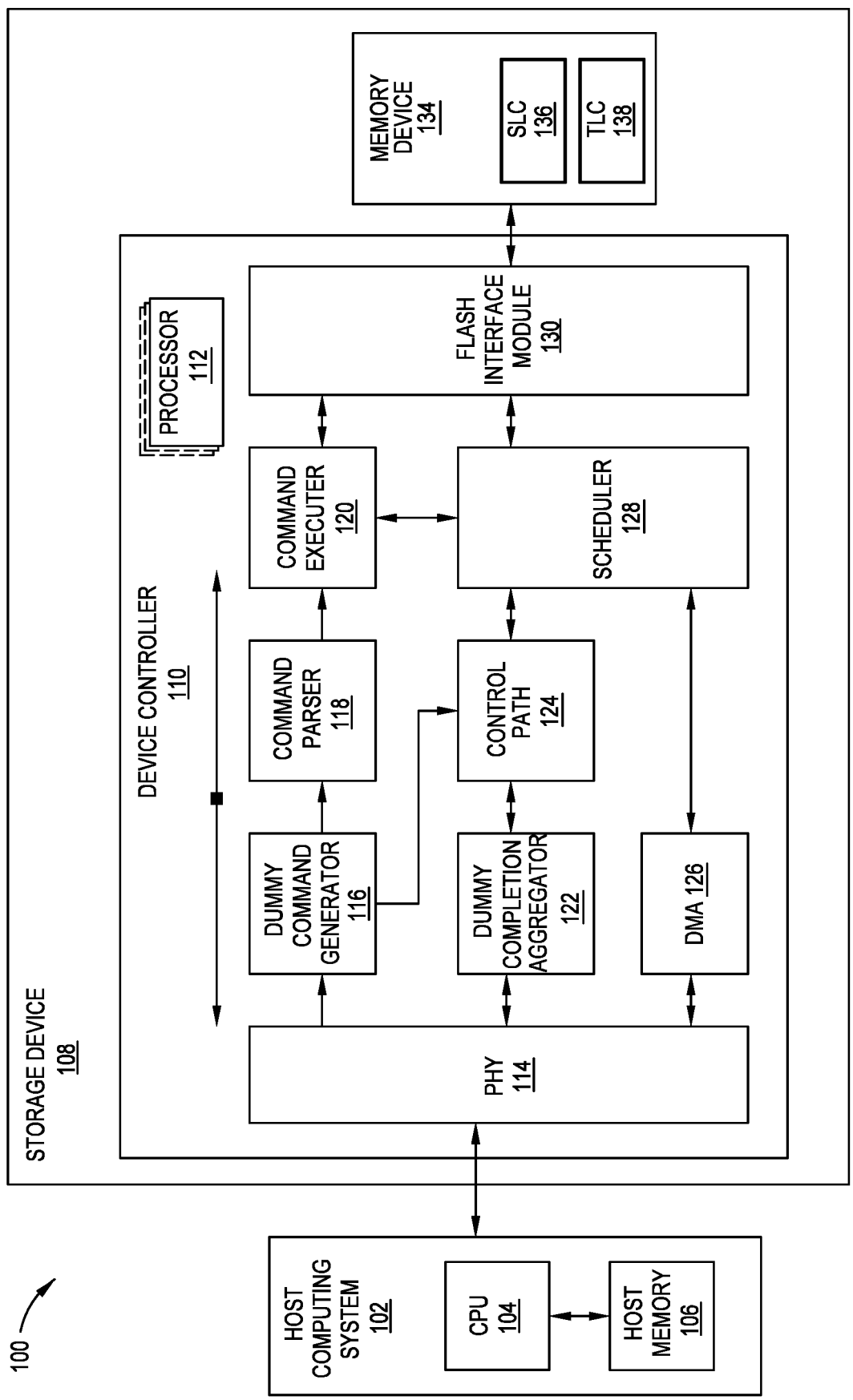
FIG. 1 is a block diagram of a memory device communicatively coupled to a host computer system, in accordance with certain aspects of the disclosure.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to systems and methods for executing commands that are larger than the maximum data transfer size (MDTS) on a data storage device. The data storage device advertises to the host device a MDTS that is higher than the actual MDTS that the data storage device can actually handle. If the data storage device receives a command that is equal to or less than the actual MDTS, then the data storage device processes the command normally. If the data storage device receives a command that is greater than the actual MDTS, but with less than or equal to the advertised MDTS, the data storage device splits the command into a plurality of dummy commands for processing. Once all of the dummy commands have processed, the data storage device delivers a completion message to the host device.

The disclosure describes an innovative method for high values of MDTS and even infinite value using dummy Host command generation. Once the SSD device fetches a command of a size that exceeds a pre-configured threshold, command fetching is either disabled or the relevant command slots are allocated. In parallel, host metadata (e.g. PRPs/SGL) may or may not be fetched from host memory. Then, a new component generates dummy host commands. The number of required dummy host commands depend on various parameters such as original command size, state of the storage device, PRPs/SGL usage, atomic granularity, security zones etc. Each dummy host command passes the regular command execution path while all components are not aware that this is actually a dummy host command. The dummy host command passes through the command parser, command executer, scheduler etc. The dummy command generation may be done out of order and is based on resource availability rather than splitting a command in order. Finally, a new component is implemented which is responsible for gathering the completion of the dummy commands and generating host completion notifications once completing all dummy commands. In parallel, the new logic may send a hint to the firmware (FW) that further sequential requests are pending so the FW may be ready ahead of time.

The main benefit of the disclosure is the method for supporting large command sizes and even infinite in a way that is transparent to all components in SSD device. In addition, the generation of the dummy commands are done in a smart way which increases the quality of service and efficiency of the device.

FIG. 1 is a schematic illustration of one embodiment of a system 100 including a host computing system 102 communicatively coupled to a storage device 108. Storage device 108 includes a controller 110 and a memory device 134, such as anon-volatile memory (NVM) device made up of one or more one or more dies or planes of flash memory cells (e.g., single level cells (SLC 136), multi-level cells (MLC), tri level cells (TLC 138), etc.). Host computing system 102 interfaces with the storage device 108 to issue I/O commands for memory operations, including: read, write, copy, and reset (e.g., erase) at the memory device 134. Specifically, the device controller 110 incorporates MAC and PHY and several other components such as: PCIe PHY/MAC which are responsible for the implementation of the physical, link and transport layers as the interface components 114 with the host computing system 102; a command parser 118 which is responsible for parsing the host commands and queuing the commands internally; a command executer 120 which is responsible for arbitrating and executing the commands; processors 112 which are responsible for the execution of front-end and back-end tasks; DMA 126 which is responsible for the actual data transfer between the host computing system 102 and the storage device 108; flash interface module 130 which is responsible for controlling and accessing the memory arrays; scheduler 128 which is responsible for activating and scheduling the various components in this implementation; and control path 124 is responsible for transferring control information between host computing system 102 and storage device 108. The control path 124 may include the commands, data pointers and completion messages.

Storage device 108 may be an internal storage drive, such as a notebook hard drive or a desktop hard drive. Storage device 108 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 108 may take the form of an embedded mass storage device, such as an eSD/eMMC embedded flash drive, embedded in host 108. Storage device 108 may also be any other type of internal storage device, removable storage device, embedded storage device, external storage device, or network storage device.

Host computing system 102 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 102 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

In some configurations, host computing system 102 includes a central processing unit (CPU) 104 connected to a host memory 106, such as DRAM or other main memories. An application program may be stored to host memory 106 for execution by CPU 104. For example, host memory 106 may include a computer-readable medium that stores computer-readable program code (e.g., software or firmware) executable by processor 104. The host computing system 102 can be configured with hardware and/or firmware to perform the various functions described below and shown in the flow diagrams.

Storage device 108 includes physical (PHY) interface components 114, for ingress of communications from host 102 to storage device 108 and egress of communications from storage device 108 to host computing system 102. A link between storage device 108 and host 102 may include any appropriate link, such as a peripheral component interconnect express (PCIe) link. PCIe link supports full duplex communication between storage device 108 and host computing system 102 via dedicated unidirectional serial point-to-point connections, or "lanes." PCIe link can include one to thirty-two lanes, depending on the number of available PHYs 114 between storage device 108 and host computing system 102.

Communications between storage device 108 and host computing system 102 may operate under a communication protocol, such as a PCIe serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. Storage device 108 may also be connected to host computing system 102 through a switch or a bridge.

Memory device 134 of storage device 108 may include a non-volatile memory space configured for long-term storage of information after power on/off cycles. In some examples, memory device 134 may consist of one of more dies or planes of NAND flash memory, electrically programmable read only memories (EPROM), electrically erasable programmable read only memories (EEPROM), and other solid-state memories.

Storage device 108 includes a controller 110 which manages operations of storage device 108, such as writes to and reads from memory device 134. Controller 110 includes one or more processors 112, which may be multi-core processors. Processor 112 handles the components of storage device 108 through firmware code.

Controller 110 may operate under NVM Express (NVMe) protocol, but other protocols are applicable. NVMe protocol is a communications interface/protocol developed for SSDs to operate over a host and storage device linked over the PCIe interface (e.g., PHY 114). NVMe protocol provides a command submission queue and command completion queue for access of data stored in storage device 108 by host 102. Storage device 108 may fetch, receive, or read host 102 commands from a command submission queue of host queues stored in host memory 106.

Controller 110 executes computer-readable program code (e.g., software and/or firmware) executable instructions (herein referred to as "instructions"). The instructions may be executed by various components of controller 110, such as processor 112, logic gates, switches, application specific integrated circuits (ASICs), programmable logic controllers, embedded microcontrollers, and other components of controller 110.

The instructions are stored in a non-transitory computer readable storage medium. In some embodiments, the instructions are stored in a non-transitory computer readable storage medium of storage device 108, such as in a read-only memory or in memory device 134. Instructions stored in storage device 108 may be executed without added input or directions from host computing system 102. In other embodiments, the instructions are transmitted from host computing system 102. The controller 110 is configured with hardware and instructions to perform the various functions described herein and shown in the figures.

Storage device 108 may also include other components, such as flash interface module 130, a direct memory access (DMA) module 126, a scheduler 128, a command executor 120, and a control path 124. Flash interface module 130 interacts with memory device 134 for operations associated with various I/O commands for controlling and accessing the SSD (e.g., memory device 134). DMA module 126 is configured to control actual data transfers between host computing system 102 and storage device 108. Scheduler 128 is configured to activate and schedule the various components illustrated in FIG. 1. For example, scheduler 128 controls the data transfer while activating the control path 124 for fetching physical page regions (PRPs), posting completion requests and interrupts, and activating the DMAs for the actual data transfer between host computing system 102 and storage device 108. Control path 124 is configured to transfer control information between host computing system 102 and storage device 108, and provide completion requests to a vector completer 122. Command parser 118 is configured to parse and queue commands received from a dummy command generator 116, and communicate the commands to command executer 120. The command executer 120 is configured to arbitrate and execute the commands received from the command parser 118.

The dummy command generator 116 and the dummy completion aggregator 122 may relate to one or more of a hardware, firmware, and/or software implementation on the device controller 110 for supporting vector-type commands from host computing system 102. In some configurations, the dummy command generator 116 monitors I/O commands received from the host computing system 102.

The dummy command generator 116 and the dummy completion aggregator 122 are responsible for accelerating the commands while making the commands transparent to other components. The dummy command generator 122 is a block that monitors all arrival commands. The dummy command generator 116 first detects whether the command is a large command (more than a threshold). If the command is not, the command is transferred as is to the command parser 118 for further execution. Otherwise, the dummy command generator 116 interacts with the control path 124 and may fetch the metadata of the command while stopping fetching new commands from the host computing system 102. Then, the dummy command generator 116 generates dummy host small commands while the entire set of the dummy command is logically equivalent to the single large command. This is done by converting the pointers provided by the host computing system 102 correctly to the new structure. All dummy commands are queued in command parser 118 for further execution. Once the operation has completed, the storage device 108 will continue fetching new commands from the host computing device 102. In another embodiment, the storage device 108 does not stop fetching new commands from the host computing system 102. Instead, the storage device 108 makes sure to not fetch more commands from the host computing system 102 based on the current available command slots while taking into account the dummy commands which will be generated by the dummy command generator 116.

The dummy completion aggregator 122 is responsible for gathering all completion messages associated with the generated dummy commands. Those entries will not be posted to the host computing system 102. Instead, the dummy completion aggregator 122 gathers those entries and once getting all completion associated with the command, a completion message is generated based on the content of the dummy completion messages and posted to the host computing system 102.

In some configurations, the dummy completion aggregator 122 gathers all completion messages associated with the plurality of dummy commands generated by the dummy command generator 116. Initially, the gathered completion messages will not be provided to the host computing system 102. Instead, once all the completion messages associated with the plurality of dummy commands are received, the dummy completion aggregator 122 generates a command completion message based on the content of all the completion requests associated with the plurality of dummy commands. That is, the dummy command completion message is an indication that the command received from the host computing system 102 and converted to the plurality of dummy commands has been completed. The dummy completion aggregator 122 then provides the command completion message to the host 102.

In some configurations, device controller 110 is responsible for handling I/O commands received from host computing system 102, ensuring data integrity and efficient storage, and managing the memory device 134. To perform these tasks, controller 110 runs a flash translation layer (FTL) firmware. FTL tasks may be executed by one or more processors 112 utilizing one or more of the aforementioned components. FTL may also performs numerous other functions, including: error code correction (i.e., use of redundant data, or parity data to recover a message with errors); garbage collection (i.e., identifying/invalidating stale data in memory device 134 memory blocks for deletion to free space for future writes); scheduling (i.e., controlling the order in which I/O commands from host 102 are executed); over-provisioning (i.e., memory reserved for maintaining write speed); and wear-leveling (i.e., spreading writes across the blocks of the memory device 134 as evenly as possible to ensure that all blocks of the device wear at a roughly similar rate).

However, in some configurations, host computing system 102 may be responsible for some or all of the FTL tasks. For example, memory device 134 may include a physically addressable SSD, such as an SSD. In such a configuration, the SSD may expose the internal parallel organization of the memory device 134 to the host computing system 102 so that the memory device 134 can be directly managed by host 102.

Figure 2:
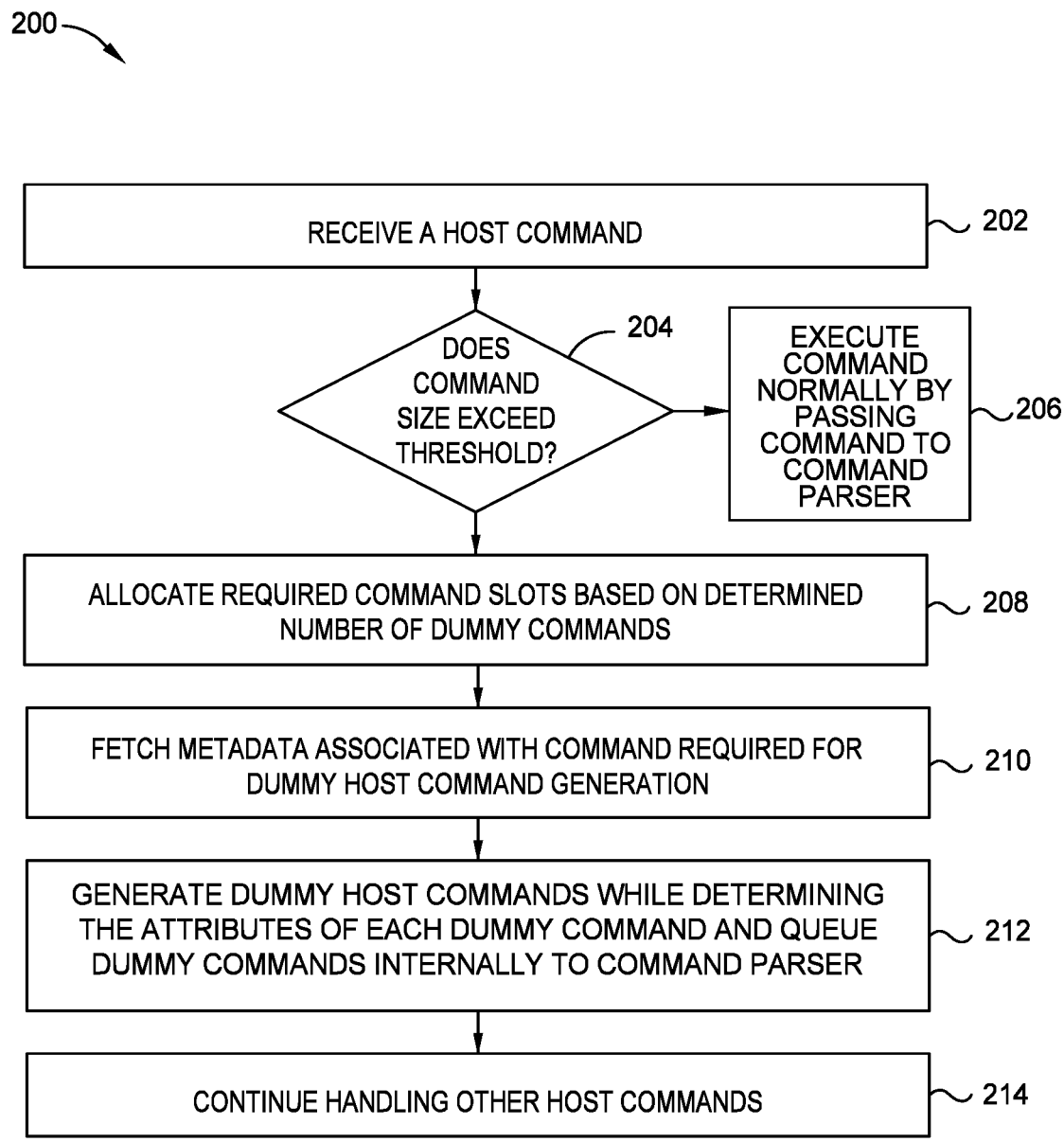
FIG. 2 is a flow diagram illustrating an exemplary process for executing command in accordance with certain aspects of the disclosure.

FIG. 2 is a flow diagram 200 illustrating an exemplary process for executing command in accordance with certain aspects of the disclosure. The process starts by receiving a host command at block 202. A determination is made in block 204 as to whether the command size exceeds the MDTS threshold of the storage device. If the command is a small-size command, the command is executed normally by queueing it to command parser in block 206. If the command is a large-size command (i.e., greater in size than the MDTS of the storage device), at this point the storage device allocates all required command slots in order to break down the command to several small-size commands in block 208. If there are not sufficient command slots, only part of the dummy commands will be generated, and the rest will be generated later when command slots are recycled (i.e., after completion). In one embodiment, the storage device may stop fetching other commands from the host at this point until completing the generation of the dummy commands. In other embodiments, the storage device will not stop fetching new commands but it will take into account the number of dummy commands that are going to be generated. Next, the device may fetch the metadata of the command required for the generation of the dummy commands in block 210. Then, the storage device generates the dummy host commands by calculating correctly the host pointers associated with each dummy command in block 212. Logically, the entire set of dummy commands are equivalent to the original command. Finally, storage device will continue handling other host commands in block 214. Note that in one implementation, other commands can be pushed to the command parser in the middle of dummy host commands. The new logic may update the FW that more sequential dummy commands are pending so the FW may be able to be ready for accepting them.

It is to be noted that the terms "dummy command" and "dummy host command" are used interchangeably. Similarly, the terms "original command", "original host command" and "host command" are used interchangeably.

In one embodiment, the dummy host commands are generated in order based on the sequential logical addresses provided by the host. In other embodiments, dummy commands are generated in a more efficient order without having the exact same size for each dummy command. It is done in the order that is much convenient to the storage device. It is based on several parameters in order to increase the QoS and performance of the storage device such as: original command size; state of the storage device and the associated NAND dies; PRPs/SGL usage and their structure; atomic granularity (i.e., the dummy commands will not cross the atomic granularity into two different dummy commands); and/or security zones (i.e., the dummy command will not cross security ranges).

Figure 3:
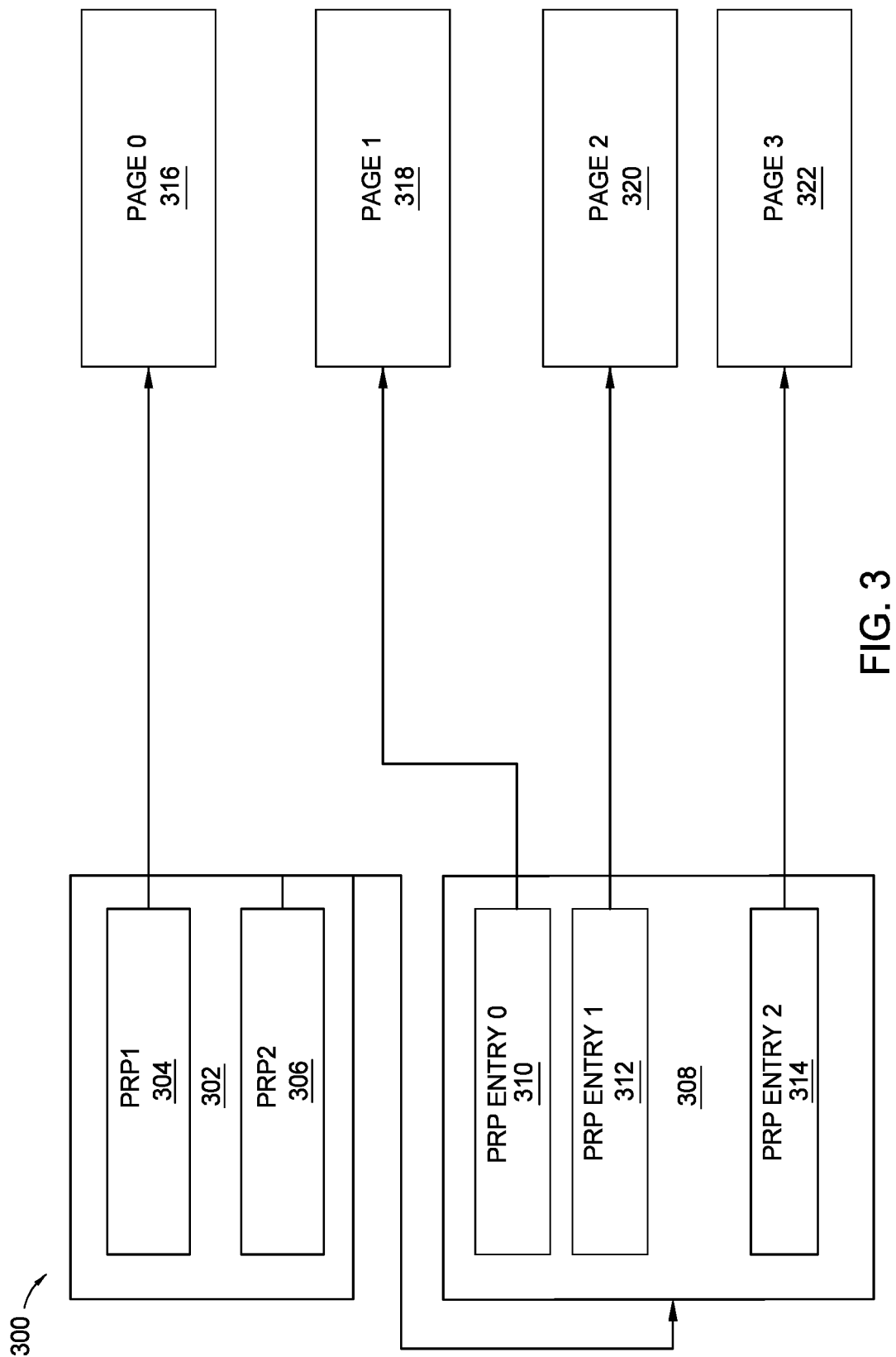
FIG. 3 is a schematic diagram of a scenario of host memory buffers in accordance with certain aspects of the disclosure.

FIG. 3 is a schematic diagram of a scenario of host memory buffers in accordance with certain aspects of the disclosure. More specifically, FIG. 3 shows a PRP list 300 where host memory buffers where the command 302 includes PRP1 304 points to the first buffer at Page 0 316 and PRP2 306 points to a PRP list 308 that includes PRP entry 0 310, PRP entry 1 312, and PRP entry 2 314 that point to the second buffer at Page 1 318, the third buffer at Page 2 320, and the fourth buffer at Page 3 322 respectively. In this case, storage device calculates correctly the values of PRP1 304 and PRP2 306 for each dummy command. In addition, the size of each command is determined to be optimized to the performance of the command and having convenient PRP structure for each dummy command.

Figure 4:
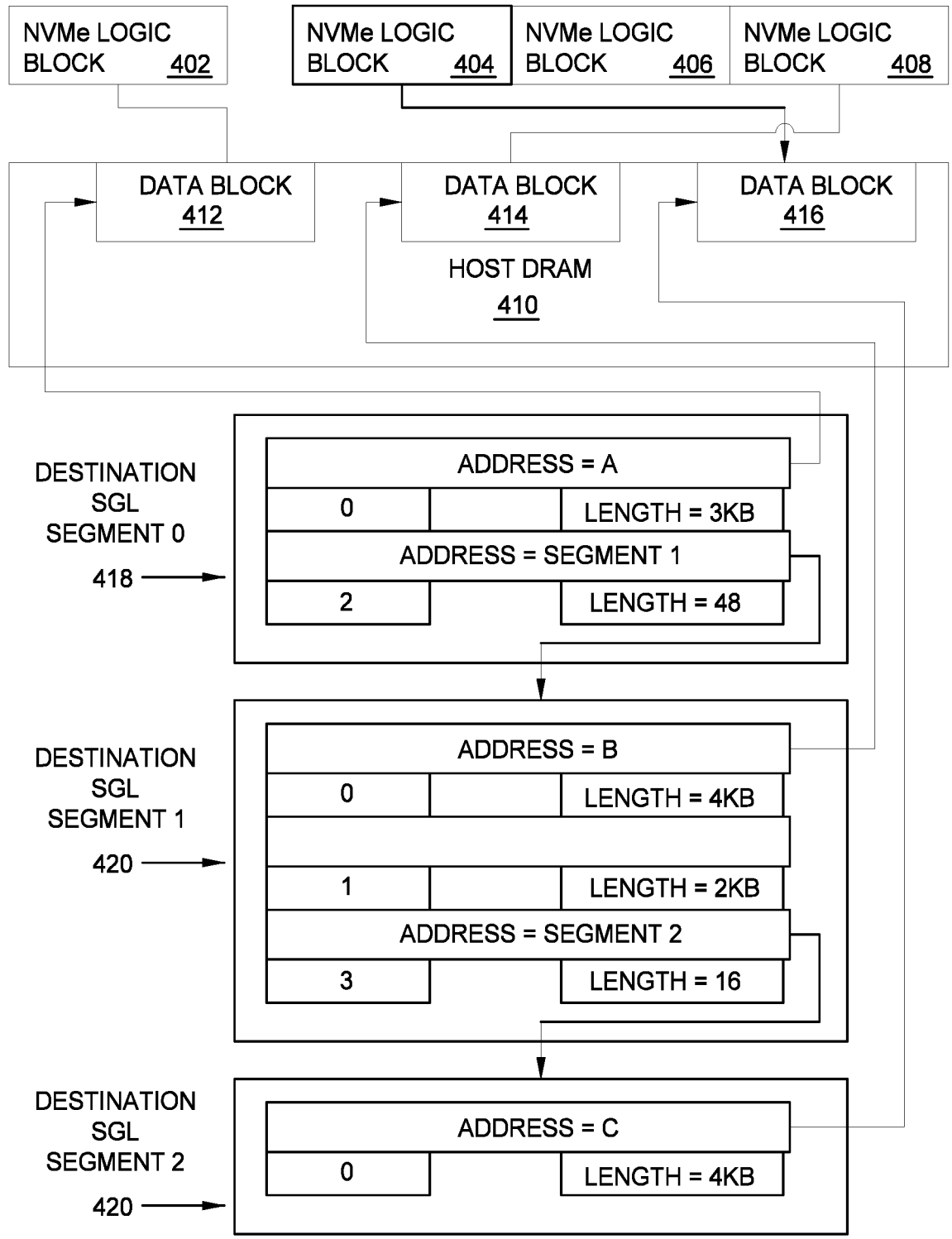
FIG. 4 is a schematic diagram of a scatter-gather list in accordance with certain aspects of the disclosure.

FIG. 4 is a schematic diagram of a scatter-gather list (SGL) in accordance with certain aspects of the disclosure. When using SGL, based on the structure of the specific SGL, the logic decides the optimal dummy Host commands needed for the best performance. FIG. 4 illustrates an SGL example. In the example, the logical block size is 512B. The total length of the logical blocks accessed is 13 KB, of which only 11 KB is transferred to the host. The number of logical blocks (NLB) field, which has NVMe logic block 402, NVMe logic block 404, NVMe logic block 406, and NVMe logic block 408 in the command shall specify 26, indicating the total length of the logical blocks accessed on the controller is 13 KB. NVMe logic block 406 is bit bucket data and is not transferred. There are three SGL segments (Destination SGL Segment 0 418, Destination SGL Segment 1 420, and Destination SGL Segment 2 422) describing the locations in memory where the logical block data is transferred.

The three SGL segments 418, 420, 422 contain a total of three data block descriptors 412, 414, 416 with lengths of 3 KB, 4 KB and 4 KB respectively. SGL segment 1 420 of the destination SGL contains a Bit Bucket descriptor with a length of 2 KB that specifies to not transfer (i.e., ignore) 2 KB of logical block data from the NVM. Segment 1 of the destination SGL also contains a Last Segment descriptor specifying that the segment pointed to by the descriptor is the last SGL segment.

More specifically, the NLB field includes NVMe logic block 402 that ultimately points to data block 412, NVMe logic lock 404 that ultimately points to data block 416, NVMe logic block 406 that is bit bucket data and not transferred, and NVMe logic block 408 that ultimately points to data block 414. The data blocks 412, 414, 416 are disposed in host DRAM 410.

Destination SGL Segment 0 418 includes Address=A that has an SGL data block descriptor "0" that specifies that 3 KB are to be transferred. There is also a segment descriptor at Address=Segment 1 that points to the next memory location (i.e. Destination SGL Segment 1 420) of the SGL and has a length of 48.

Destination SGL Segment 1 420 includes Address=B that has an SGL data block descriptor "0" that specifies that 4 KB are to be transferred. Additionally, there is a bit bucket descriptor "1" that specifies to not transfer the next 2 KB of the logical block data. There is also a segment descriptor at Address=Segment 2 that points to the next memory location (i.e. Destination SGL Segment 2 422) of the SGL and has a length of 16. This is the last segment description "3" that points to the last memory location of the SGL (i.e. Destination SGL Segment 2 422).

Destination SGL Segment 1 422 includes Address=C that has an SGL data block descriptor "0" that specifies that 4 KB are to be transferred.

In this example, if the size of each data segment was larger, the generated dummy command size could be equal to the SGL data segment size. This behavior will simplify the transfer of each dummy command. In addition, the bit-bucket part could be ignored by the Dummy Host Command Generator. For this part, a dummy command will not be generated to the storage device will not even fetch this data from the media.

Figure 5:
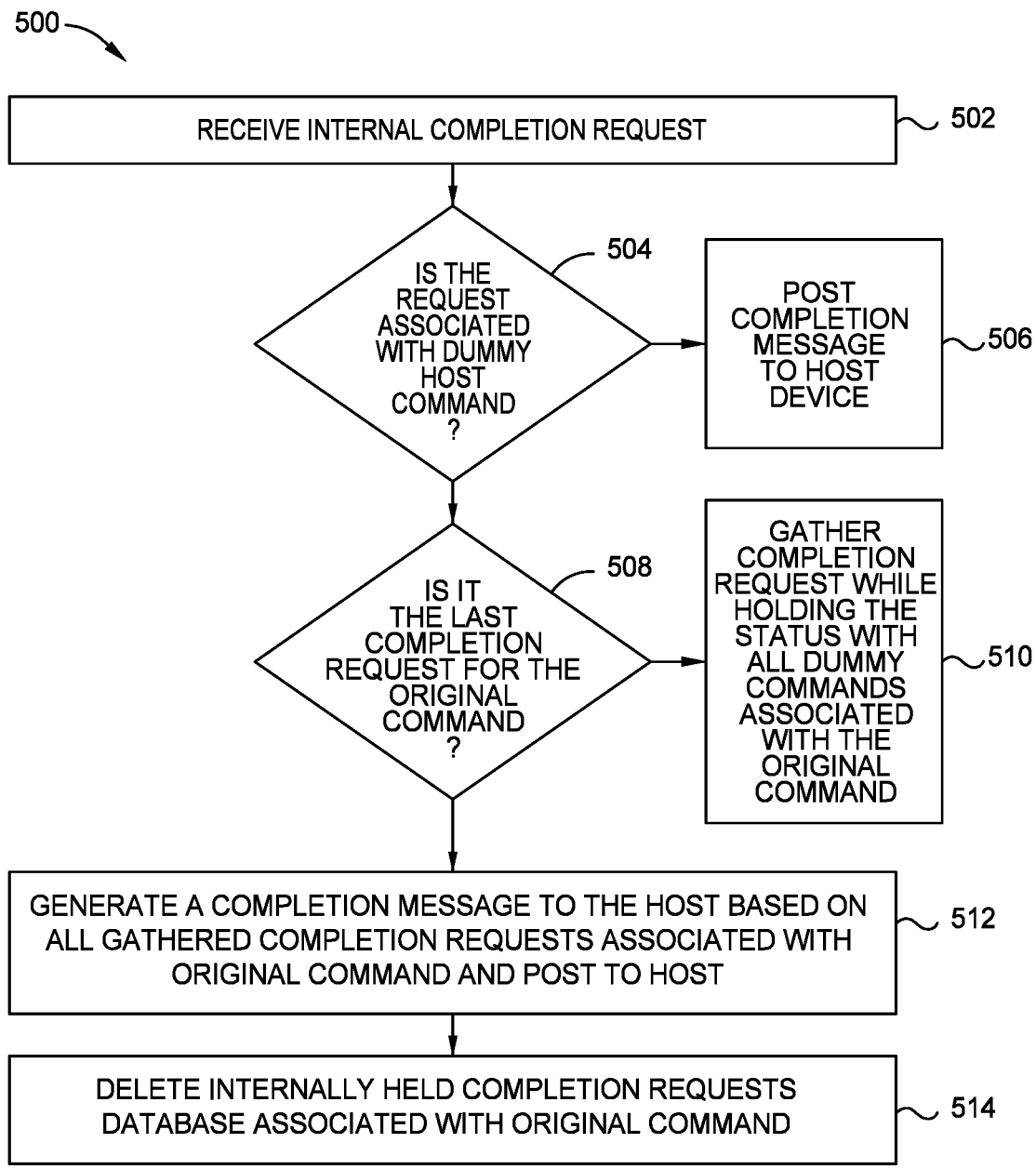
FIG. 5 is a flow diagram illustrating an exemplary process for delivering a command completion message in accordance with certain aspects of the disclosure.

FIG. 5 is a flow diagram 500 illustrating an exemplary process for delivering a command completion message in accordance with certain aspects of the disclosure. The flow starts by getting an internal completion posting request at 502. Next, a determination is made regarding whether the request is associated with a dummy host commend at 504. If the completion request is not associated with a dummy host command, a completion entry is generated and posted to the host at 506. If the request is associated with a dummy host command, then a determination is made at 508 as to whether the request is the last completion request for the original command. If the request is not the last completion request for the original command, the logic aggregates all completion requests associated with the original large-size host command without posting anything to the host in 510. When getting all completion requests (that may arrive out of order), a completion entry is generated based on the previous aggregated entries and posted to host at 512. Thereafter, the internally held completion requests database that is associated with the original command is deleted at 514.

In summary, the disclosure relates generally to systems, methods, and apparatus for receiving commands from host computing system 102 that are larger than the MDTS of the storage device 108, and executing the commands on an SSD (e.g., memory device 134) with minimal changes to a storage device 108. In particular, certain aspects of the disclosure relate to methods and apparatus for supporting commands such that the commands are processed transparently to the host 102 and several components of the storage device 108. In other words, the data storage device is able to advertise an MDTS to a host device that is greater than the actual MDTS that the data storage device could normally handle. However, because the data storage device can split a command into dummy command, the data storage device can actually process very large commands. For example, the dummy command converter 116 may be configured to generate a plurality of dummy commands from a single command, and pass the plurality of dummy commands onto other components of the storage device 108 for execution. Moreover, the dummy completion aggregator 122 may generate a command completion message based on the completion of the plurality of dummy commands, and pass the completion message to the host computing system 102. Here, the host computing system 102 may not be provided with an indication of how the command was processed.

In some examples, the generation, by the dummy command generator 116, of the plurality of dummy commands from a single command provides the device controller 110 with the capacity to intelligently schedule the plurality of dummy commands to improve efficiency of the storage device 108. In one example, the dummy command generator 116 may generate the dummy commands in order of priority, where a physical address associated with an available parallel unit gets higher priority than a physical address associated with a busy parallel unit. In this configuration, quality of service and efficiency of the storage device 108 is improved.

In one embodiment, a data storage device comprises: a memory device; and a controller communicatively coupled to the memory device, wherein the controller is configured to: retrieve a command from a host device, wherein the command exceeds the maximum data transfer size (MDTS) for the data storage device; split the command into a plurality of dummy commands; process the dummy commands; and deliver a completion notification to the host device. The controller is further configured to track a number of the dummy commands. The controller is further configured to: determine that a number of dummy commands to be generated is greater than a number of available command slots; and generate the dummy commands, wherein a number of dummy commands generated is equal to the number of available command slots. The controller is further configured to: determine that additional command slots are available; and generate additional dummy commands. The controller is further configured to: determine that a number of dummy commands to be generated is greater than a number of available command slots; and stop retrieving commands from the host device. The controller is further configured to retrieve metadata associated with the command. The controller is further configured to generate dummy commands in order based on sequential logical addresses provided by the host device. The controller is further configured to generate dummy commands out of sequential logical address order, wherein the dummy commands are generated based upon the command size. The controller is further configured to push commands to a command parser in the middle of a dummy command.

In another embodiment, a data storage device comprises: a memory device; and a controller communicatively coupled to the memory device, wherein the controller is configured to: receive an indication that the memory has executed a dummy command, wherein the dummy command is one of a plurality of dummy commands corresponding to a command received from a host device; determine whether the memory device has executed all of the plurality of dummy commands corresponding to the command; generate a completion message indicating execution of the command if the memory device has executed each of the plurality of dummy commands; and transmit the completion message to the host device. The controller is further configured to store the indication that the memory device has executed the dummy command if the memory device has not executed all of the plurality of dummy commands corresponding to the command. The controller is further configured to: receive a plurality of indications that the memory device has executed a dummy command, wherein each of the plurality of indications correspond to one of the plurality of dummy commands; store the plurality of indications; and clear the stored plurality of indications after transmission of the completion message to the host device. The controller is further configured to gather completion requests while holding a status with all dummy commands associated with the command. The controller is further configured to hold a completion request until all requests in a command have been completed. Each of the plurality of dummy commands is configured to be executed in a sequential order by the memory device. The completion message is generated by a dummy completion aggregator. The dummy commands are generated by a dummy command generator.

In another embodiment, an apparatus comprises: means for receiving a command from a host device, wherein the command exceeds the maximum data transfer size (MDTS) for the device; means for generating a set of dummy commands, wherein each dummy command in the set of dummy commands corresponds to a portion of the command, and wherein each dummy command in the set of dummy commands is configured to be executed by a means for storing digital data; and means for generating a message to the host device indicating completion of the command in response to the execution of the set of dummy commands by the means for storing digital data. The apparatus further comprises means for aggregating each completed dummy command. The apparatus further comprises means for determining whether a command register contains an available slot, wherein the command register comprises a plurality of 1-bit slots; and means for fetching a command from the host computing device if the command register contains the available slot.

By using dummy commands, the data storage device is able to trick a host device into believing the data storage device can support very large MDTS without introducing any impact to the data storage device or affecting any other parameters.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller communicatively coupled to the memory device, wherein the controller is configured to:
retrieve a command from a host device, wherein the command exceeds the maximum data transfer size (MDTS) for the data storage device;
split the command into a plurality of dummy commands;
determine that a number of dummy commands to be generated is greater than a number of available command slots;
generate the dummy commands, wherein a number of dummy commands generated is equal to the number of available command slots;
process the dummy commands; and
deliver a completion notification to the host device.

2. A data storage device, comprising:
a memory device; and
a controller communicatively coupled to the memory device, wherein the controller is configured to:
retrieve a command from a host device, wherein the command exceeds the maximum data transfer size (MDTS) for the data storage device;
split the command into a plurality of dummy commands;
determine that a number of dummy commands to be generated is greater than a number of available command slots;
stop retrieving commands from the host device;
process the dummy commands; and
deliver a completion notification to the host device.

3. A data storage device, comprising:
a memory device; and
a controller communicatively coupled to the memory device, wherein the controller is configured to:
receive an indication that the memory has executed a dummy command, wherein the dummy command is one of a plurality of dummy commands corresponding to a command received from a host device;
determine whether the memory device has executed all of the plurality of dummy commands corresponding to the command;
receive a plurality of indications that the memory device has executed a dummy command, wherein each of the plurality of indications correspond to one of the plurality of dummy commands;
store the plurality of indications;
generate a completion message indicating execution of the command if the memory device has executed each of the plurality of dummy commands;
transmit the completion message to the host device; and
clear the stored plurality of indications after transmission of the completion message to the host device.

4. An apparatus, comprising:
means for determining whether a command register contains an available slot, wherein the command register comprises a plurality of 1-bit slots;
means for fetching a command from the host computing device if the command register contains the available slot;
means for receiving a command from a host device, wherein the command exceeds the maximum data transfer size (MDTS) for the device;
means for generating a set of dummy commands, wherein each dummy command in the set of dummy commands corresponds to a portion of the command, and wherein each dummy command in the set of dummy commands is configured to be executed by a means for storing digital data; and means for generating a message to the host device indicating completion of the command in response to the execution of the set of dummy commands by the means for storing digital data.

5. The data storage device of claim 1, wherein the controller is further configured to:

track a number of the dummy commands.

6. The data storage device of claim 1, wherein the controller is further configured to:

determine that additional command slots are available; and generate additional dummy commands.

7. The data storage device of claim 1, wherein the controller is further configured to retrieve metadata associated with the command.

8. The data storage device of claim 1, wherein the controller is further configured to generate dummy commands in order based on sequential logical addresses provided by the host device.

9. The data storage device of claim 1, wherein the completion notification corresponds to the completion of the generated dummy commands associated with the command.

10. The data storage device of claim 2, where the controller is further configured to generate dummy commands out of sequential logical address order, wherein the dummy commands are generated based upon the command size.

11. The data storage device of claim 2, wherein the controller is further configured to push commands to a command parser in the middle of a dummy command.

12. The data storage device of claim 3, wherein the controller is further configured to store the indication that the memory device has executed the dummy command if the memory device has not executed all of the plurality of dummy commands corresponding to the command.

13. The data storage device of claim 3, wherein the controller is further configured to gather completion requests while holding a status with all dummy commands associated with the command.

14. The data storage device of claim 3, wherein the controller is further configured to hold a completion request until all requests in a command have been completed.

15. The data storage device of claim 3, wherein each of the plurality of dummy commands is configured to be executed in a sequential order by the memory device.

16. The data storage device of claim 3, wherein the completion message is generated by a dummy completion aggregator.

17. The data storage device of claim 3, wherein the dummy commands are generated by a dummy command generator.

18. The data storage device of claim 3, wherein each dummy command of the plurality of dummy commands comprises a segment descriptor, and wherein the segment descriptor comprises a pointer pointing to a next memory location.

19. The apparatus of claim 4, further comprising:

means to determine which dummy command of the set of dummy commands has been completed.

20. The apparatus of claim 19, further comprising:

means for aggregating each completed dummy command.

* * * * *